United States Patent
Wang et al.

(10) Patent No.: US 9,280,914 B2
(45) Date of Patent: Mar. 8, 2016

(54) VISION-AIDED HEARING ASSISTING DEVICE

(71) Applicant: National Central University, Taoyuan County (TW)

(72) Inventors: Jia-Ching Wang, Taoyuan County (TW); Chang-Hong Lin, Taoyuan County (TW); Chih-Hao Shih, Taoyuan County (TW)

(73) Assignee: National Central University, Taoyuan (TW)

( * ) Notice: Subject to any disclaimer, the term of this patent is extended or adjusted under 35 U.S.C. 154(b) by 77 days.

(21) Appl. No.: 14/249,362

(22) Filed: Apr. 10, 2014

(65) Prior Publication Data

US 2014/0307879 A1 Oct. 16, 2014

(30) Foreign Application Priority Data

Apr. 11, 2013 (TW) .............................. 102112931 U

(51) Int. Cl.
*G09B 21/00* (2006.01)
*G10L 21/10* (2013.01)

(52) U.S. Cl.
CPC .............. *G09B 21/009* (2013.01); *G10L 21/10* (2013.01)

(58) Field of Classification Search
CPC ............................... G09B 21/009; G10L 21/10
See application file for complete search history.

(56) References Cited

U.S. PATENT DOCUMENTS

| | | | |
|---|---|---|---|
| 6,240,392 B1 * | 5/2001 | Butnaru | G09B 21/009 704/271 |
| 7,627,475 B2 | 12/2009 | Petrushin | |
| 7,684,984 B2 | 3/2010 | Kemp | |
| 7,729,914 B2 | 6/2010 | Tato et al. | |
| 8,461,986 B2 * | 6/2013 | Snyder | H04R 25/305 340/4.1 |
| 2002/0071661 A1 | 6/2002 | Nakano et al. | |
| 2006/0167687 A1 * | 7/2006 | Kates | G09B 21/00 704/235 |
| 2007/0270196 A1 * | 11/2007 | Wu | H04M 1/05 455/575.2 |
| 2009/0192707 A1 * | 7/2009 | Nakatsuka | G01C 21/3629 701/431 |
| 2010/0094626 A1 * | 4/2010 | Li | G10L 15/02 704/234 |
| 2012/0162259 A1 * | 6/2012 | Sakai | G01S 3/8083 345/634 |
| 2013/0142347 A1 * | 6/2013 | Lord | H04R 29/005 381/58 |
| 2014/0074478 A1 * | 3/2014 | Ahrens | G10L 13/08 704/260 |

FOREIGN PATENT DOCUMENTS

| | | |
|---|---|---|
| CN | 101809651 A | 8/2010 |
| CN | 102543099 A | 7/2012 |
| TW | 446933 | 7/2001 |
| TW | I233090 B | 5/2005 |
| TW | I312127 B | 7/2009 |
| TW | 201124949 A | 7/2011 |

* cited by examiner

*Primary Examiner* — Brenda Bernardi
(74) *Attorney, Agent, or Firm* — CKC & Partners Co., Ltd.

(57) ABSTRACT

The present invention discloses a vision-aided hearing assisting device, which includes a display device, a microphone and a processing unit. The processing unit includes a receiving module, a message generating module and a display driving module. The processing unit is electrically connected to the display device and the microphone. The receiving module receives a surrounding sound signal, which is generated by the microphone. The message generating module analyzes the surrounding sound signal according to a present-scenario mode to generate a related message related with the surrounding sound signal. The display driving module drives the display device to display the related message.

10 Claims, 2 Drawing Sheets

VISION-AIDED HEARING ASSISTING DEVICE

This application claims priority to Taiwanese Application Serial Number 102112931, filed Apr. 11, 2013; which is herein incorporated by reference.

BACKGROUND

1. Technical Field

The present invention relates to a vision-aided hearing assisting device.

2. Description of Related Art

Sound is one of the most important media for communication in our daily life. With ears, people can understand others through voice, listen to music, hear rings of alarm clocks or operate electronic equipments with the assistance of sounds. In addition, an alarm can be sounded, such as sirens of ambulances or police cars and sounds of fire alarms in buildings. Sounds and our daily life are closely connected and inseparable.

The hearing-impaired cannot hear complete sounds, and, therefore, often lose important information carried in the sound. Most of the hearing-impaired may wear hearing aids or cochlear implants to enable sufficient hearing capability. However, hearing aids may at the same amplify environment noise along with the sound of interest. It normally takes a long time to get along with the cochlear implants so as to recognize the sounds from the cochlear implants, which may lead the users to put away their cochlear implants.

Therefore, there is a need to assist the hearing-impaired to understand the information carried in sounds without amplifying environment noises and/or without taking too much time for accustoming themselves to assisting means.

SUMMARY

According to one embodiment of this invention, a vision-aided hearing assisting device is provided to display information about surrounding sounds through a display device. The vision-aided hearing assisting device includes a display device, a microphone and a processing unit. The microphone senses surrounding sound so as to generate a surrounding sound signal. The processing unit is electrically connected to the display device and the microphone. The processing unit includes a receiving module, a message generating module, and display driving module. The receiving module receives the surrounding sound signal. The message generating module analyzes the surrounding sound signal according to a present-scenario mode to generate a related message related with the surrounding sound signal. The display driving module drives the display device to display the related message.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
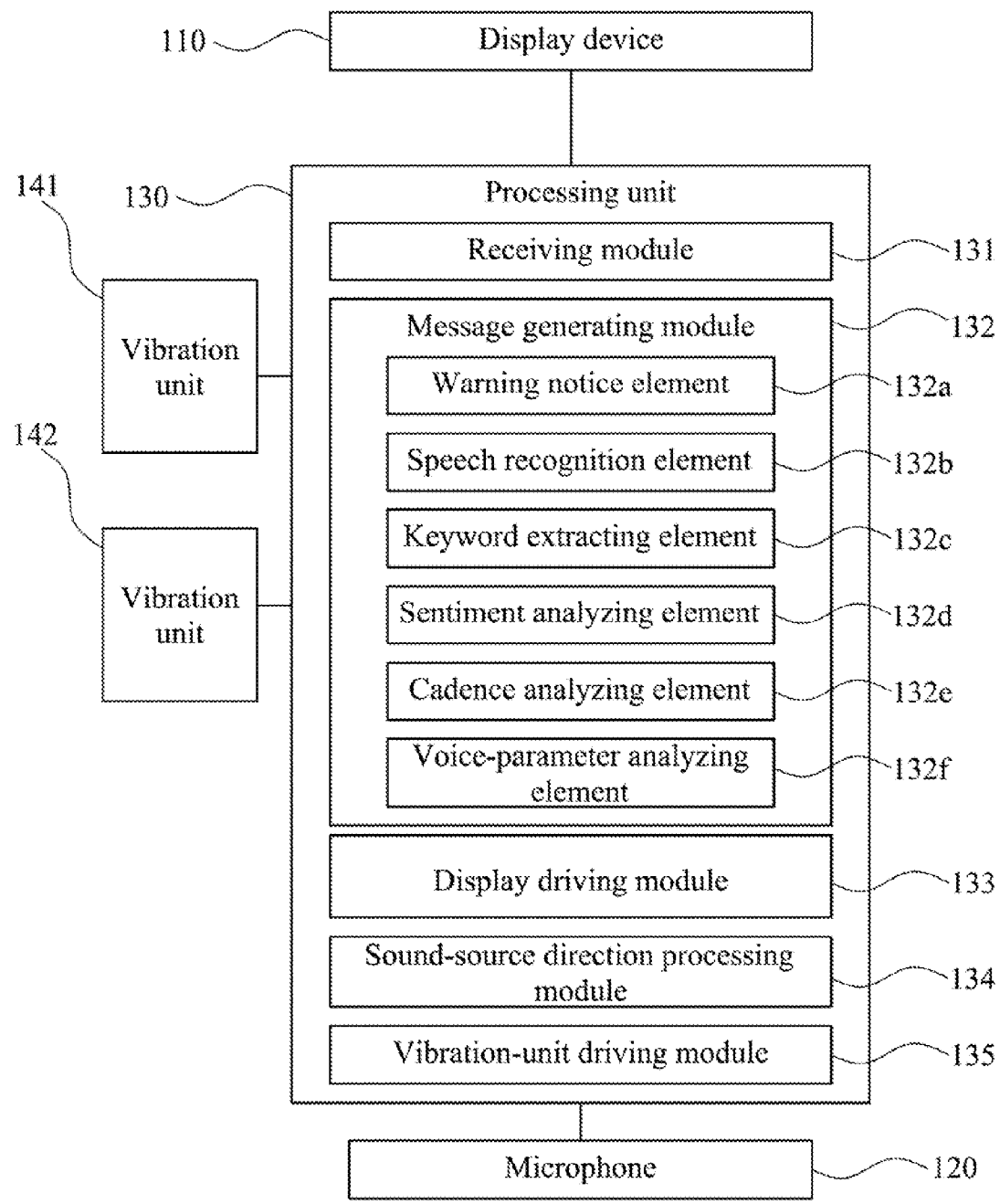
FIG. 1 illustrates a block diagram of a vision-aided hearing assisting device according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, a block diagram will be described that illustrates a vision-aided hearing assisting device according to one embodiment of this invention. The vision-aided hearing assisting device 100 displays information about surrounding sounds through a display device.

The vision-aided hearing assisting device 100 includes a display device 110, a microphone 120 and a processing unit 130. In some embodiments, the display device 110 can be a head-mounted display (HMD) or other suitable display. The processing unit 130 is electrically connected to the display device 110 and the microphone 120. The microphone 120 senses surrounding sound around the vision-aided hearing assisting device 100 so as to generate a surrounding sound signal.

The processing unit 130 includes a receiving module 131, a message generating module 132, and a display driving module 133. The receiving module 131 receives the surrounding sound signal from the microphone 120. The message generating module analyzes the surrounding sound signal according to a present-scenario mode to generate a related message related with the surrounding sound signal. The related message may include words, pictures or other information for display or combination thereof. In some embodiments of this invention, the message generating module 132 may perform analysis to the surrounding sound signal through a cloud server on a network to assist in generating the related message of the surrounding sound signal.

The display driving module 133 drives the display device 110 to display the related message. Therefore, when a hearing-impaired user wears the display device 110, he/she can easily understand the information about the sound around him/her. In addition, the display device 110 is worn before a users eyes, which leads that the users sight may not be covered.

In some embodiments of this invention, the processing unit 130 may further include a sound-source direction processing module 134. The sound-source direction processing module 134 analyzes at least one sound-source direction of the surrounding sound. The message generating module 132 inserts information about the at least one sound-source direction into the related message. Subsequently, the display driving module 133 drives the display device 110 to display the information of the at least one sound-source direction in the related message. Therefore, a user can understand that where the sound represented in the related message comes from and then can react in such a direction.

In some other embodiments of this invention, the user of the vision-aided hearing assisting device 100 may be noticed through the display device 110 when an emergency occurs. Hence, the message generating module 132 may further include a warning notice element 132a. When the present-scenario mode is a warning mode, the warning notice element 132a compares the surrounding sound signal with several emergency response models. When the surrounding sound signal matches one of the emergency response models, the warning notice element 132*a* generates a warning notice message corresponding to the matched emergency response model to be embedded into the related message. In some embodiments, the processing unit 130 may perform preprocess, such as denoise or sound source separation, to the surrounding sound signal, such that the warning notice element 132*a* can perform the comparison precisely. In one scenario of this invention, when the warning notice element 132*a* under the warning mode determines that the surrounding sound signal matches an emergency response model about a horn of a vehicle being honked after comparison, the related message, such as "Beware of cars" or any other warning message, may be generated to notice the user to avoid the vehicle.

The vision-aided hearing assisting device 100 may further include at least two vibration units 141, 142 electrically connected to the processing unit 130, and the processing unit 130 may further include a vibration-unit driving module 135. The vibration units 141, 142 may be ear-hanging vibration units or other types of vibration unit or combination thereof. The vibration-unit driving module 135 may drive the vibration unit corresponding to the at least one sound-source direction to generate vibration. For example, the user may wear the vibration unit 141 on left (such as his/her left ear) and may wear the vibration unit 142 on right (such as his/her right ear). Hence, when the sound-source direction processing module 134 determines that a matched emergency model happens (such as a horn of a vehicle is honked) from left, the vibration-unit driving module 135 may drive the vibration unit 141 worn on left to generate vibration to notice the user to avoid the vehicle form left. In some other embodiments of this invention, other types of units to generate notice, such as electric shocks, may be utilized to replace the vibration units 141, 142, which should not be limited in this disclosure.

To provide another example, when the warning notice element 132*a* under the warning mode determines that the surrounding sound signal matches an emergency response model about a baby's crying noise, the elated message, such as "Your child is crying" or any other warning message, may be generated to notice the user to take care of his/her baby.

In some other embodiments of this invention, the message generating module 132 may include a speech recognition element 132*b*. When the present-scenario mode is a speech recognition mode, the speech recognition element 132*b* may perform speech recognition to translate a surrounding speech signal from the surrounding sound signal into a speech content and generate the related message according to the speech content. The message generating module 132 may further a keyword extracting element 132*c*. The keyword extracting element 132*c* extracts at least one keyword from the speech content for generating the related message. Therefore, number of words in the related message may be reduced, which is suitable for the display device 110 to display. In some other embodiments of this invention, the keyword extracting element can extract keywords, number of which fits word-number limit of the display device 110. Therefore, the situation that too many keywords are extracted for the display device 110 to display can be avoided.

In some other embodiment of this invention, the message generating module 132 may include a sentiment analyzing element 132*d*. When the present-scenario mode is a sentiment recognition mode, the sentiment analyzing element 132*d* analyzes a surrounding speech signal from the surrounding sound signal to generate information about present sentiment of a neighboring person. The sentiment analyzing element 132*d* embeds the information about the present sentiment of the neighboring person into the related message for the display device 110 to display. Therefore, the user wearing the vision-aided hearing assisting device 100 can understand other's sentiment easily.

In addition, the message generating module 132 may further include a cadence analyzing element 132*e*. The cadence analyzing element 132*e* analyzes cadence information from a surrounding speech signal from the surrounding sound signal. Hence, the sentiment analyzing element 132*d* generates the cadence information of speech of the neighboring person and embeds the cadence information into the related message.

In some other embodiments of this invention, the message generating module 132 may include a voice-parameter analyzing element 132*f*. The voice-parameter analyzing element 132*f* analyzes at least one voice parameter from a surrounding speech signal from the surrounding sound signal, and to embed the at least one voice parameter into the related message for the display device 110 to display. The voice parameter may include a pitch, volume, any other voice parameter or combination thereof. Therefore, the user wearing the vision-aided hearing assisting device 100 can understand more information about sound around him/her to react more properly.

Figure 2:
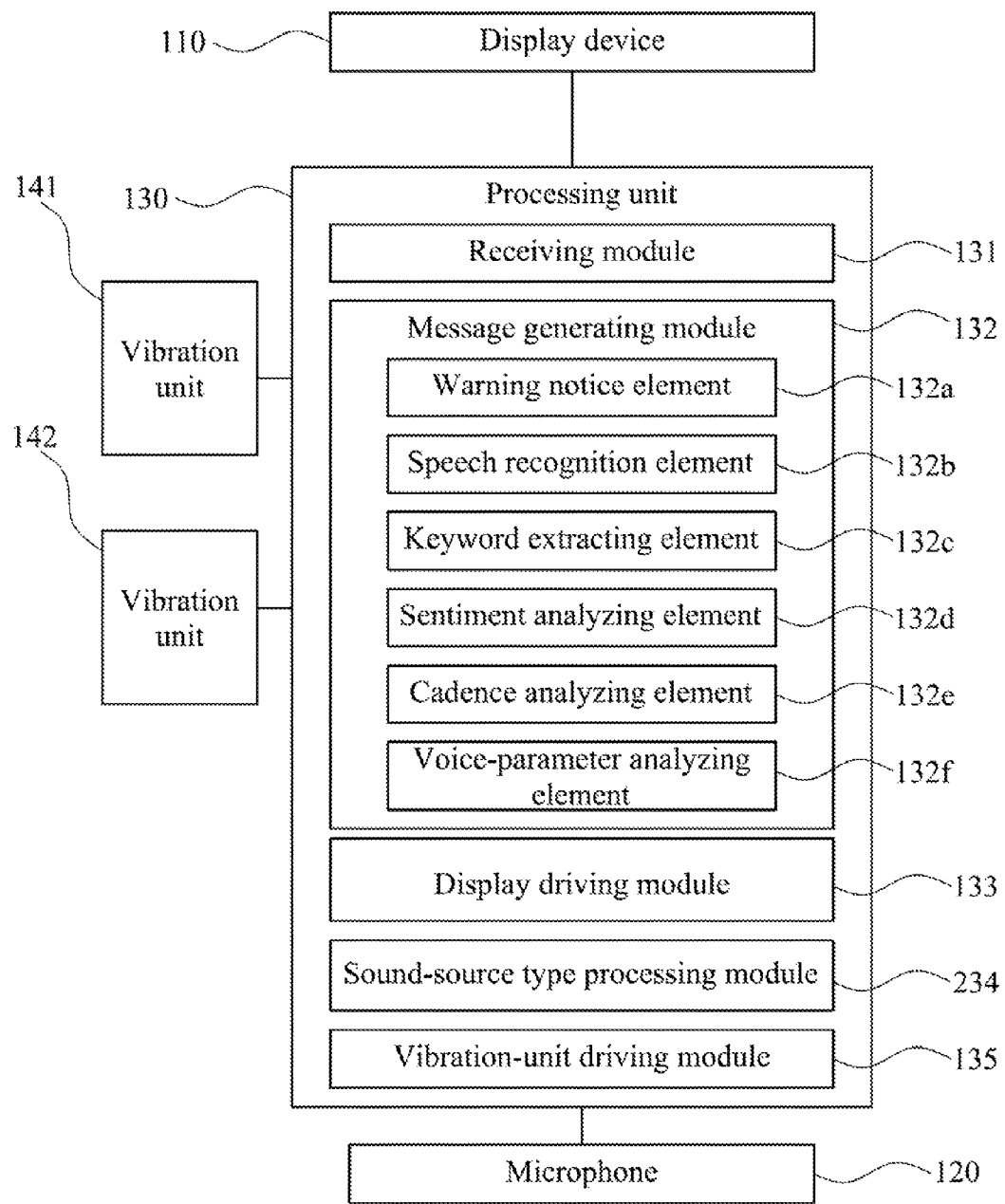
FIG. 2 illustrates a block diagram of a vision-aided hearing assisting device according to another embodiment of this invention.

FIG. 2 illustrates a block diagram of a vision-aided hearing assisting device according to another embodiment of this invention. Compared to the embodiment illustrated in FIG. 1, the vision-aided hearing assisting device 200 does not include the sound-source direction processing module 134, but includes a sound-source type processing module 234; in other words, the sound-source direction processing module 134 in FIG. 1 is replaced by the sound-source type processing module 234.

The sound-source type processing module 234 analyzes at least one sound-source type of the surrounding sound. The message generating module 132 inserts information about the at least one sound-source type into the related message. Subsequently, the display driving module 133 drives the display device 110 to display the information of the at least one sound-source type in the related message. Therefore, a user can understand what the sound represented in the related message is and then can react in corresponding situations.

In some embodiments, the vision-aided hearing assisting device 200 includes the sound-source type processing module 234 and the sound-source direction processing module 134 in FIG. 1, such that a user can understand where the sound represented in the related message comes from and what the sound represented in the related message is.

The sound-source type processing module 234 and the sound-source direction processing module 134 are given for illustrative purposes. Various processing modules for processing various characteristics of the sound-source, e.g., volumes are within the contemplated scope of the present invention.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A vision-aided hearing assisting device comprising:
a display device;
a microphone configured to sense surrounding sound so as to generate a surrounding sound signal; and
a processing unit electrically connected to the display device and the microphone, the processing unit comprising:
a receiving module configured to receive the surrounding sound signal;
a message generating module configured to analyze the surrounding sound signal according to a present-scenario mode to generate a related message, wherein the related message is related with the surrounding sound signal and the present-scenario mode, wherein the message generating module generates different related messages according to different present-scenario modes; and
a display driving module configured to drive the display device to display the related message.

2. The vision-aided hearing assisting device of claim 1, wherein the processing unit further comprises:
a sound-source direction processing module configured to analyze at least one sound-source direction of the surrounding sound,
wherein the message generating module inserts information about the at least one sound-source direction into the related message, such that the display device driving module drives the display device to display the information of the at least one sound-source direction in the related message.

3. The vision-aided hearing assisting device of claim 1, wherein the processing unit further comprises:
a sound-source type processing module configured to analyze at least one sound-source type of the surrounding sound;
wherein the message generating module inserts information about the at least one sound-source type into the related message, such that the display device driving module drives the display device to display the information of the at least one sound-source type in the related message.

4. The vision-aided hearing assisting device of claim 1, wherein the message generating module comprises:
a warning notice element configured to compare the surrounding sound signal with a plurality of emergency response models when the present-scenario mode is a warning mode,
wherein, when the surrounding sound signal matches one of the emergency response models, the warning notice element generates a warning notice message corresponding to the matched emergency response model, to be embedded into the related message.

5. The vision-aided hearing assisting device of claim 4 further comprising:
at least two vibration units electrically connected to the processing unit,
wherein the processing unit further comprises:
a sound-source direction processing module configured to analyze at least one sound-source direction of the surrounding sound; and
a vibration-unit driving module configured to drive the vibration unit corresponding to the at least one sound source type or at least one sound-source direction, to generate vibration.

6. The vision-aided hearing assisting device of claim 1, wherein the message generating module comprises:
a speech recognition element configured to translate a surrounding speech signal from the surrounding sound signal into a speech content, and generate the related message according to the speech content.

7. The vision-aided hearing assisting device of claim 6, wherein the message generating module further comprises:
a keyword extracting element configured to extract at least one keyword from the speech content for generating the related message.

8. The vision-aided hearing assisting device of claim 1, wherein the message generating module comprises:
a sentiment analyzing element configured to analyze a surrounding speech signal from the surrounding sound signal to generate information about present sentiment of a neighboring person, and to embed the information about the present sentiment of the neighboring person into the related message.

9. The vision-aided hearing assisting device of claim 8, wherein the message generating module further comprises:
a cadence analyzing element configured to analyze cadence information from a surrounding speech signal from the surrounding sound signal, wherein the sentiment analyzing element generates the cadence information of speech of the neighboring person and embeds the cadence information into the related message.

10. The vision-aided hearing assisting device of claim 1, wherein the message generating module comprises:
a voice-parameter analyzing element configured to analyze at least one voice parameter from a surrounding speech signal from the surrounding sound signal, and to embed the at least one voice parameter into the related message.

* * * * *